Patented Feb. 23, 1943

2,312,001

UNITED STATES PATENT OFFICE 2,312,001

PRODUCTION OF DRY ALKALI METAL PHENOLATES

Theodor Sabalitschka, Berlin-Steglitz, Germany, assignor to Heyden Chemical Corporation, New York, N. Y., a corporation No Drawing. Application April 5, 1940, Serial No. 328,109. In Germany April 19, 1939

3 Claims. (Cl. 260—473)

This invention relates to a method of producing the dry alkali metal phenolates of higher esters of the p- and m-oxybenzoic acids.

Alkali metal compounds of the phenols are usually produced by the transformation or reaction of phenols and alkali-metal alcoholates. This process is complicated and can be applied to certain phenols only. For example, alkali metal compounds of phenols containing saponifiable ester groups cannot be produced in pure state, but contain products of the saponification, since saponification of the esters takes place to a considerable extent already during action of the alkali metal alcoholates upon such phenols or during the subsequent removal of the alcohol.

A process for the production of alkali metal compounds of the methyl ester of the p-oxybenzoic acid has been described (Th. Sabalitschka u. F. L. Schweitzer, Archiv d. Pharmacie 267, S. 684, 1929), according to which a concentrated solution of alkali metal hydroxide in methyl alcohol is caused to react with an etheric solution of the ester, the resulting phenolate of the ester being precipitated immediately by a further addition of ether and the like, in the form of powder. This process cannot be applied to the higher esters of the p- and m-oxybenzoic acid, since the phenolates thereof would not be separated in the form of powder, but in the form of a paste or smear which it is very difficult to transform into a solid state.

I have now found that the alkali metal compounds of the esters of the p- and m-oxybenzoic acid containing three or more carbon atoms in the ester radical can be readily and quickly produced, practically free from products of esterification, by working up equivalent quantities of ester and alkali metal hydroxide with a small quantity of water, advantageously in a grinding up or thorough mixing operation, the quantities being rated so that complete transformation to phenolate is obtained while the formation of larger portions of concentrated alkali metal solution is avoided.

According to a preferred method, an intimate mixture of equivalent amounts of ester and alkali metal hydroxide is worked up with a quantity of water such that, while a complete reaction to phenolate occurs, the formation of substantial quantities of concentrated alkali and phenolate solution is avoided, so that the end product of the reaction is a pulverulent mass.

Advantageously, the amount of water is added in one batch. By grinding up or any other suitable treatment, a mass of viscous to tough consistence is obtained at first; owing to the reaction heat which is being produced, the water is partly evaporated already during the mixing operation and on further mixing and cooling down, the viscous or thickly liquid mass is transformed into a powder.

In this procedure, application of heat is not required.

Where it is desired to obtain the phenolate as a finished product, without any subsequent treatment for removal of the water, at least about ½ mole and advantageously not more than about 2 moles of water should be admixed per 1 mole ester. Larger quantities of water contained in the mass would render it necessary for the mass to be dried for a larger period of time, taking special precautions by application of vacuum or the like, since intense heating is not admissible to avoid saponification of the esters.

The above described methods may also be used to transform esters which have been substituted by halogen, and mixtures of esters, into alkali metal phenolates.

The alkali metal phenolates of the higher esters of the p- and m-oxybenzoic acid or of their halogen substitution products obtained in this manner may be employed, besides other fields of use, for preservation, disinfection and antiseptic purposes.

According to one known process it has been proposed to work up solutions of caustic alkali with the bornyl esters of the aromatic monooxycarbon acids, to form saline compounds. This procedure is not applicable in the production of the solid alkali metal compounds of the esters of p- and m-oxybenzoic acids and the halogen derivatives thereof with propyl alcohols or higher alcohols as well as aromatic alcohols, since the compounds obtained would be in the form of more or less liquid or smeary masses rather than solid substances, owing to the fact that the alkali metal compounds of these esters of the p- and m-oxybenzoic acid and their halogen derivatives are readily dissolved in water. Commercial processes for the production of dry alkali metal compounds of these esters were not known so far, and, therefore, the alkalis have been simply mixed with these esters. The mixtures have the severe drawback, however, due to their contents of free alkali, of being strongly hygroscopic, whereby they tend to stick together. On the other hand, the alkali metal compounds of the esters produced in accordance with the present invention do not show this tendency.

*Example 1.*—11.4 parts by weight of p-oxybenzoic acid-benzyl ester are thoroughly mixed with 2 parts by weight of powdered sodium hydroxide, 1.2 parts water are added to this mixture, in one batch, and the mass which at first is tough is further ground up until it has been transformed into a fine powder form. The powder produced in this manner may be dried in vacuum by means of caustic soda, to obtain an absolutely dry mass.

*Example 2.*—9 parts by weight of m-oxybenzoic acid isopropyl ester together with 2.8 parts by weight of powdered potassium hydroxide and 0.9 part by weight of water are treated as described under Example 1 and transformed into the respective potassium ester phenolate.

*Example 3.*—11.4 parts by weight of 3-chlorine-4-oxybenzoic acid normal butyl ester together with 2 parts by weight of powdered sodium hydroxide and 0.8 part by weight of water are treated as described under Example 1, and transformed into the respective phenolate.

*Example 4.*—4.85 parts by weight of p-oxybenzoic acid butyl ester and 4.5 parts by weight of p-oxybenzoic acid propyl ester are mixed with 2 parts by weight of powdered sodium hydroxide; 0.7 part by weight of water are added thereto as under Example 1 and the procedure is finished as under 1.

The method of the present invention has been described in detail with reference to specific embodiments. It is to be understood, however, that the invention is not limited by such specific reference but is broader in scope and capable of other embodiments than those specifically described.

I claim:

1. A method of producing alkali metal phenolates of the esters of the group comprising esters of p- and m-oxybenzoic acid and the halogen derivatives thereof with a compound from the group consisting of the aliphatic alcohols with more than three carbon atoms and aromatic alcohols, comprising the steps of thoroughly mixing equivalent quantities of ester and alkali metal hydroxide with an amount of water just sufficient to effect the transformation, to produce a powderous mass.

2. A method of producing alkali metal phenolates of the esters of the group comprising esters of p- and m-oxybenzoic acid and the halogen derivatives thereof with a compound from the group consisting of the aliphatic alcohols with more than three carbon atoms and aromatic alcohols, comprising the steps of grinding up equivalent quantities of ester and alkali metal hydroxide with an amount of water just sufficient to effect the transformation, to produce a powderous mass.

3. A method of producing alkali metal phenolates of the esters of the group comprising esters of p- and m-oxybenzoic acid and the halogen derivatives thereof with a compound from the group consisting of the aliphatic alcohols with more than three carbon atoms and aromatic alcohols, comprising the steps of thoroughly mixing equivalent quantities of ester and alkali metal hydroxide with an amount of water corresponding to 0.5 mole to 2 moles water per 1 mole ester, to produce a pulverous mass.

THEODOR SABALITSCHKA.